Figure 1:
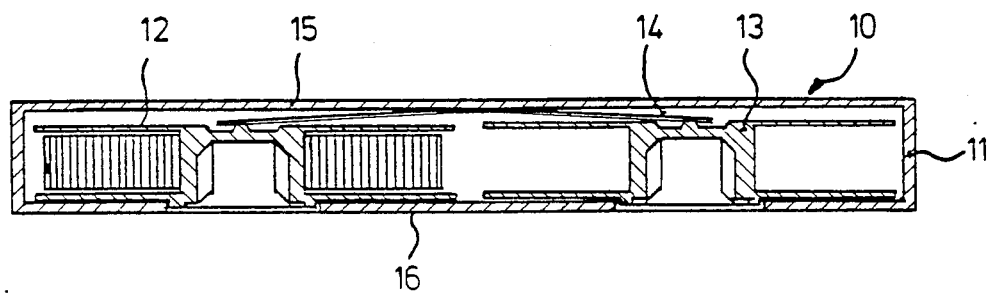

United States Patent [19]

Schoettle et al.

[11] Patent Number: 4,613,095
[45] Date of Patent: Sep. 23, 1986

[54] PLATE SPRING FOR A TAPE CASSETTE

[75] Inventors: Klaus Schoettle, Heidelberg; Herbert Dietze, Berghaupten; Juergen Dreyer, Ruelzheim; Eugen Kamm, Appenweier; Peter Wieme, Ludwigshafen; Volker Frank, Heidelberg, all of Fed. Rep. of Germany

[73] Assignee: BASF Aktiengesellschaft, Ludwigshafen, Fed. Rep. of Germany

[21] Appl. No.: 664,798

[22] Filed: Oct. 25, 1983

[30] Foreign Application Priority Data

Oct. 26, 1983 [DE] Fed. Rep. of Germany ... 8330710[U]

[51] Int. Cl.$^4$ .......................... G03B 1/04; G11B 15/32; G11B 23/04
[52] U.S. Cl. .......................................... 242/198; 83/78
[58] Field of Search .............................. 242/197-200; 360/132, 137; 352/72-78; 83/78, 39-41

[56] References Cited

U.S. PATENT DOCUMENTS

| 4,368,860 | 1/1983 | Goto | 242/199 |
| 4,449,676 | 5/1984 | Ogata et al. | 242/198 |
| 4,500,050 | 2/1985 | Oishi et al. | 242/198 |

FOREIGN PATENT DOCUMENTS

| 0086625 | 8/1983 | European Pat. Off. |
| 2090812 | 7/1982 | United Kingdom |

Primary Examiner—Leonard D. Christian
Attorney, Agent, or Firm—Keil & Weinkauf

[57] ABSTRACT

A plate spring for tape cassettes advantageously consists of two long and two short spring arms whose shapes and dimensions are optimized to achieve minimum wastage of material during punching from a sheet-metal strip. The length of the fastening arms is preferably about the same as the width of the ends of the long spring arms or less or at most 1.5 times the width. The spring can be used for all types of tape cassettes, regardless of whether they contain magnetic tape, film or other recording media. A tape cassette possesses a plate spring which has this form and is fastened by welding.

6 Claims, 9 Drawing Figures

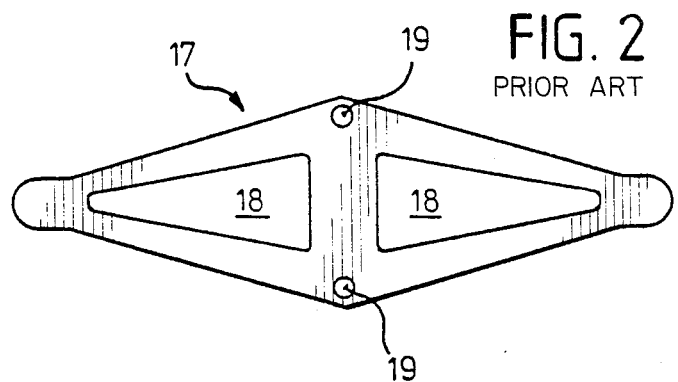
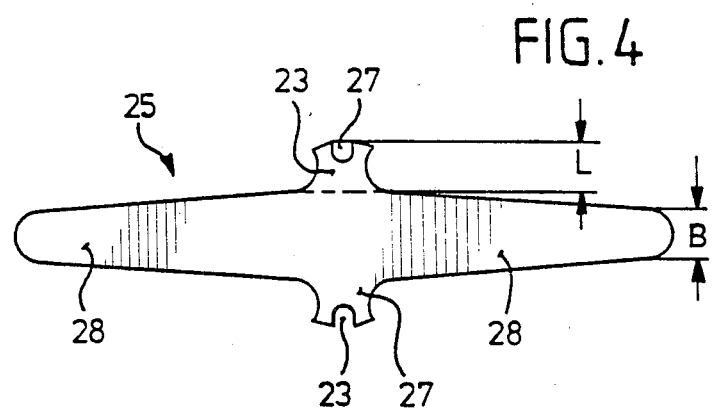

PLATE SPRING FOR A TAPE CASSETTE

The present invention relates to a plate spring for a tape cassette, in particular for a video tape cassette, for holding down the reels, consisting of two long spring arms with short fastening arms located centrally between these, the plate spring being cut out from a sheet-metal strip in a pattern in which the ends of the spring arms of one spring are adjacent to the fastening arms of the neighboring springs, and a tape cassette possessing such a plate spring.

German Laid-Open Application DOS No. 3,148,080 discloses a spring which is intended for a tape cassette, is derived from a diamond-shaped spring with cutouts, and is asymmetric with respect to its axes but centrosymmetric with respect to its center. Compared with the diamond-shaped spring, the spring results in a saving of spring metal sheet in the manufacture, but has the disadvantage that the spring arrangement is asymmetric with respect to the cassette axes.

The conventional springs are fastened by means of circular openings in the central part.

Furthermore European Laid-Open Application No. 86,625 discloses another spring for a tape cassette, which consists of two long spring arms and two shorter central fastening arms, and in which the ends of the long spring arms are rounded, and matching cutouts in the two fastening arms permit the springs to be pushed together in the longitudinal direction of the spring metal strip in such a way that virtually no gaps are left, so that once again material can be saved. In this arrangement, most of the waste occurs between successive fastening elements, i.e. more than 50% of the useful area (cf. FIG. 3). The fastening elements are likewise provided with the conventional circular openings.

It is an object of the present invention to provide a better plate spring for tape cassettes, which spring can be manufactured with less waste, and to improve the fastening of the spring in the cassette, without it being necessary to alter the cassette.

It is a further object of the present invention to provide a tape cassette which is improved with regard to the pressure spring for the reels.

We have found that these objects are achieved, in accordance with the invention, if the length of each fastening arm is about the same as the width of the end of each spring arm. In particular, L should be $\leq 1.5$ B, i.e. 1.5 times the width of the ends of the spring arms may be reached but should not be exceeded.

This results in the least possible waste at the sides during manufacture by cutting or punching, when the spring contours are fitted together in the longitudinal direction.

When, according to the invention, the fastening arms have fastening slots opening outward instead of fastening holes, welding is used to fix the spring more securely in the cassette in such a way that they do not shift.

The present invention also relates to a tape cassette possessing a plate spring which is of the form according to the invention and which is fastened according to the invention.

The Examples which are shown in the drawing and described below illustrate the invention.

Figure 3:
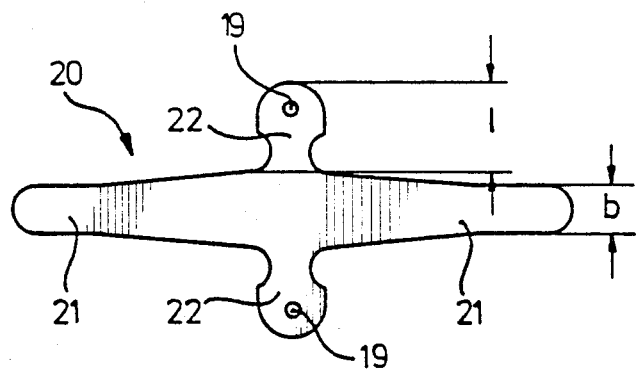
Figure 5:
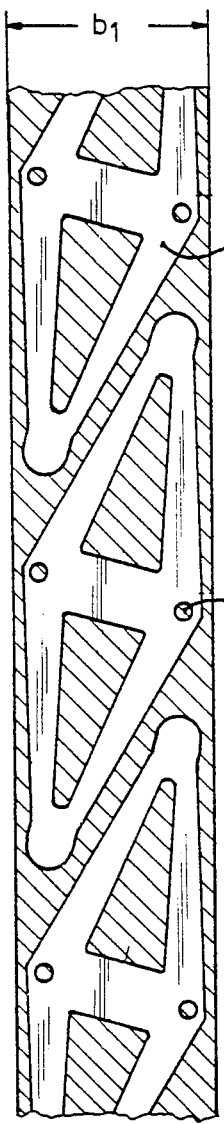
Figure 6:
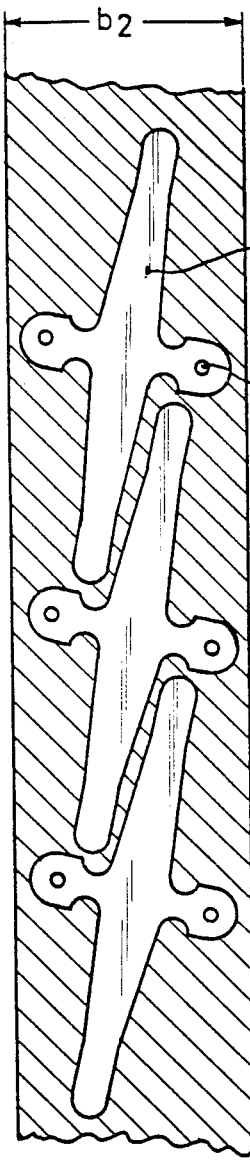
Figure 7:
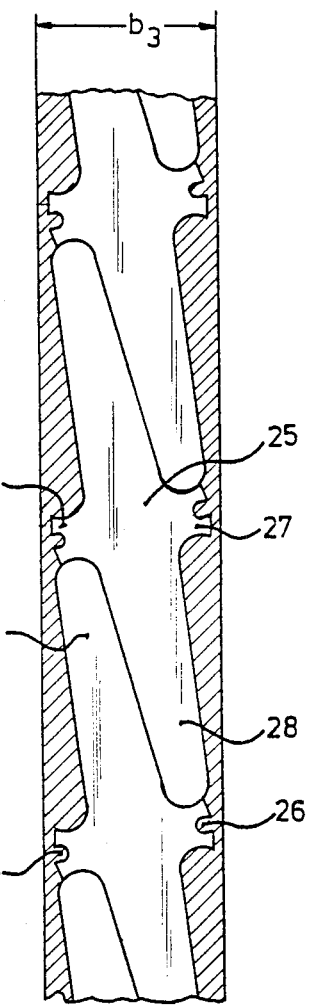
Figure 8:
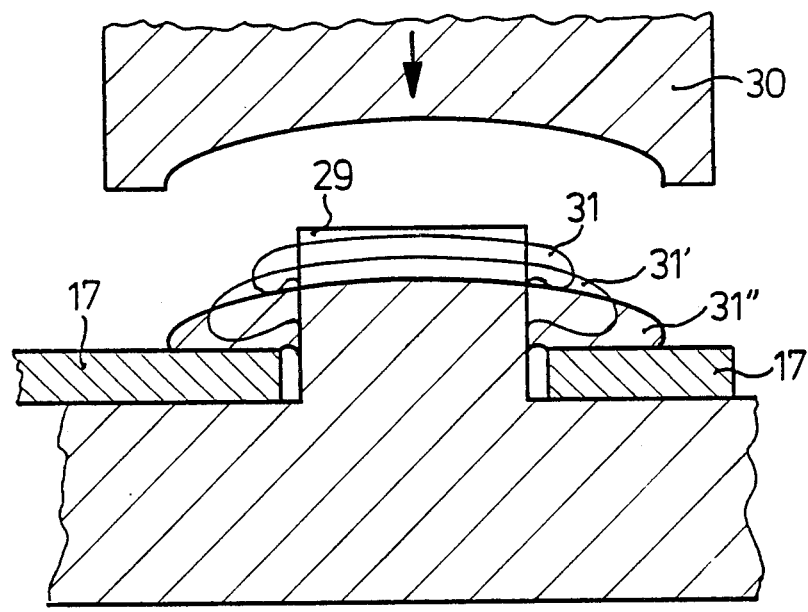
Figure 9:
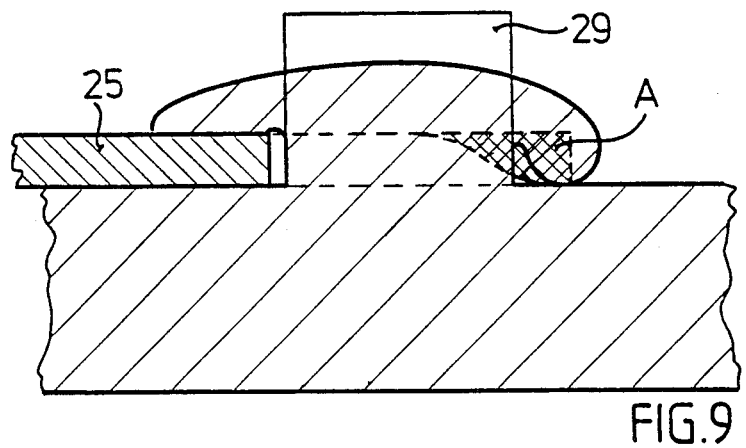

FIG. 1 is a view which shows a section through a cassette housing with a reel spring and reels, FIG. 2 is a view which shows a conventional prior art diamond-shaped reel spring, FIG. 3 is a view which shows a conventional prior art balance beam reel spring, FIG. 4 is a view which shows a reel spring according to the invention, FIG. 5 shows the prior art diamond-shaped reel spring in an optimized punching pattern, FIG. 6 is a view which shows the prior art balance beam spring in an optimized punching pattern, FIG. 7 is a view which shows the novel reel spring in its optimum punching pattern, FIG. 8 is a view which illustrates the method of fastening the spring by deforming a pin of the housing, and shows the form of the attachment, in the case of a conventional reel spring, and FIG. 9 is a view which illustrates the spring fastening for the reel spring according to the invention.

FIG. 1 illustrates a housing 11 of a video cassette 10 of one of the conventional video systems (VHS or Beta format). The reels 12 and 13 inside are pressed toward the base 16 of the housing 11 by means of a spring 14, which is fastened to the lid 15 of the said housing by welding.

Hence, when cassettes 10 are placed in the appropriate recorders, reels 12 and 13 lie evenly on the hub spindles (not shown) of the recorder, and the reels 12 and 13 run smoothly during winding of the tape.

FIGS. 2 and 3 show the commercial springs in VHS and Beta format video cassettes respectively. While the spring 17 in FIG. 2 has a roughly diamond-shaped outline and is provided with triangular cutouts 18 and fastening holes 19, the spring 20 in FIG. 3 is roughly the shape of a balance beam, with long spring arms 21 and short fastening arms 22, the latter also possessing the fastening holes 19. In the example, the length $l=13$ mm is about twice the width $b=7$ mm. FIG. 4 illustrates the novel spring 25, which has a squatter shape in the middle section and, in particular, possesses open fastening cutouts 23. The differences between the spring 25 and the conventional springs 17 and 20, and the advantages of this spring over the conventional ones, are directly evident from a comparison of FIG. 7 with FIGS. 5 and 6. Each figure represents a sheet-metal strip 24 on which are drawn the outlines of white, unshaded springs 17, 20 and 25 respectively, which have already been punched out or are still to be punched out.

The springs have the following dimensions and require the following areas on the sheet-metal strips:

| Type of spring | Dimensions/Area required | Material saved |
| --- | --- | --- |
| VHS Cassette | | |
| Spring 17 according to FIG. 5 | 40 × 70 mm = 28 cm² | 0% |
| Spring 25 according to FIG. 7 | 31 × 57.5 mm = 17.8 cm² | 36.5% |
| Beta Cassette | | |
| Spring 20 according to FIG. 6 | 40 × 48.5 mm = 19.4 cm² | 0% |
| Spring 25 according to FIG. 7 | 35 × 47 mm = 16.45 cm² | 15.5% |

The widths $B^1$ to $B^3$ of the sheet-metal strips in FIGS. 5 to 7 differ substantially. In the case of the comparative values above, only identical springs of identical length and having the same spring power have been compared with one another. In spite of the optimized arrangement of the individual springs 17 and 20 on the sheet-metal strips, the novel embodiment of the springs 25 surprisingly results in a further saving of material of more than one third in the case of the VHS spring and almost one sixth in the case of the Beta spring. The VHS and Beta springs differ only in their dimensions owing to the different reel spacing, the spring forces being in the same range. In the shape of the novel spring 25, the outlines which interlock according to the invention without leaving gaps, and, in particular, the fastening cutouts 26 which open outward in the form of slots and are roughly semicircular, are factors which contribute to this saving. The width of the spring 25 in the middle region, or, more exactly, the length of each of the fastening arms 27, is therefore advantageously reduced. The shape of the spring 25 is optimum, and hence its area and material requirements are minimal, when the length L of the fastening arm 27 is substantially the same as the width B of the end of a spring arm 28, i.e. when $L \leq 1.5 \, B$. In the example in FIG. 4, $L = 7$ mm and $B = 8$ mm, i.e. $L = 0.9 \, B$.

Moreover, the open fastening cutouts 26 possess the following advantages.

For reliable automatic insertion of the conventional spring 17 (FIG. 2), the diameter of the fastening holes 19 must be larger than that of the housing pin 29 (FIG. 8). This radial play is in general nominally 0.1–0.3 mm. In unfavorable cases, for example where all unfavorable manufacturing tolerances are present together, this play can, however, be as high as 0.5 mm. As FIG. 8 shows, the pin 29 becomes deformed downward during the welding process in the manner indicated, as a result of the sonotrode 30 being placed on top. The welding point is transformed continuously, assuming the contours 31 and 31', until the final shape 31'' is reached. It is clear that a meniscus forms at the lower end of the pin 29, where thermoplastic flow is not yet taking place; this meniscus prevents plastic material from flowing into the space which is due to the play and exists between pin 29 and the inner wall 32 of the spring hole.

Hence, the spring is held only from above, and is secured against lateral displacement within the play only by friction. During assembly or as a result of exposure to different temperatures, as occurs regularly during use of the video cassettes and can lead to partial or complete elimination of this friction, the spring 17 can accidentally shift so that the spring ends pressing on the centre of the reel are displaced laterally by as much as 0.8 mm from the center position in unfavorable cases. Consequently, when the cassettes are played in recorders with unfavorable tolerances, the ends of the springs can come into contact with other parts of the reel (for example with the welds) which interferes with the tape running.

On the other hand, the novel spring 25 is secured against lateral displacement by means of the slot-shaped fastening cutouts 26; this is achieved, as shown in FIG. 9, by a method in which, in the crosshatched area A, plastic material is forced into the slots 26 and over the edges during thermoplastic deformation of the pin 29 in the course of the welding process, with the result that, after the material has solidified, upward, downward and sideways displacement of the spring 25 are thus prevented. In general therefore, the spring is prevented from moving either in the direction at right angles to the cassette walls or in the plane of the cassette walls. Thus, any tape running problems which may arise from displacement of the spring 25 are prevented from the outset.

We claim:

1. For use in a tape cassette, in particular video tape cassette, having a top portion and a bottom portion, and a pair of rotatable tape reels therebetween,
    a plate spring having two long spring arms for resiliently urging said tape reels toward the bottom portion of said cassette, and, extending transversely and centrally from said spring arms, a pair of shorter fastening arms for affixing said plate spring to the underside of said top portion,
    said plate spring being symmetrical about its straight longitudinal axis and the length of said fastening arms being approximately the same as the width of the end of each spring arm,
    whereby, with said plate spring being cut out from a multi-plate-spring sheet metal strip in a pattern in which the end of a spring arm of one plate spring is adjacent a fastening arm of a neighboring plate spring, the contours of adjacent plate springs can be made virtually contiguous to each other and a correspoding saving in strip material be achieved.

2. A plate spring as claimed in laim 1, wherein the length of each fastening arm is 1–1.5 times the width of the end of each spring arm.

3. A plate spring as claimed in claim 1, wherein each fastening arm has an open fastening slot, as distinguished from a fastening hole, therein.

4. A tape cassette, in particular video tape cassette, having a top portion and a bottom portion, a pair of rotatable tape reels therebetween, and
    a plate spring having two long spring arms for resiliently urging said tape reels toward the bottom portion of said cassette, and, extending transversely and centrally from said psring arms, a pair of shorter fastening arms for affixing said plate spring to the underside of said top portion,
    said plate spring being symmetrical about its straight longitudinal axis and the length of said fastening arms being approximately the same as the width of the end of each spring arm,
    whereby, with said plate spring being cut out from a multi-plate-spring sheet metal strip in a pattern in which the end of a spring arm of one plate spring is adjacent a fastening arm of a neighboring plate spring, the contours of adjacent plate springs can be made virtually contiguous to each other and a corresponding saving in strip material be achieved.

5. A tape cassette as claimed in claim 4, wherein the length of each fastening arm is 1–1.5 times the width of the end of each spring arm.

6. A tape cassette as claimed in claim 4, wherein each fastening arm has an open fastening slot, as distinguished from a fastening hole, therein, and
    wherein said plate spring is fastened in the region of said slots by means of welding and is, hence, prevented from moving either in the plane of the cassette or at right angles thereto.

* * * * *

UNITED STATES PATENT AND TRADEMARK OFFICE
CERTIFICATE OF CORRECTION

PATENT NO. : 4,613,095

DATED : Sep. 23, 1986

INVENTOR(S) : Schoettle et al.

It is certified that error appears in the above-identified patent and that said Letters Patent are hereby corrected as shown below:

On the title page:
  [22] Filed: "1983" should be -- 1984 --

Col. 4, line 39, "psring" should be -- spring --

Signed and Sealed this

Sixth Day of January, 1987

Attest:

DONALD J. QUIGG

Attesting Officer      Commissioner of Patents and Trademarks